United States Patent [19]

Van Wijnen

[11] Patent Number: 5,214,794
[45] Date of Patent: May 25, 1993

[54] DESIGN COVERING AND A HOUSING FOR A PAGER

[76] Inventor: Gert Van Wijnen, Kanaal B ZZ 188, 7881 NK, Emmercompascuum, Netherlands

[21] Appl. No.: 857,276

[22] Filed: Mar. 25, 1992

[30] Foreign Application Priority Data

Mar. 26, 1991 [NL] Netherlands .......................... 9100538

[51] Int. Cl.$^5$ .............................................. H04B 1/38
[52] U.S. Cl. ...................................... 455/90; 455/351; 341/176; D 14/191
[58] Field of Search ............... 455/347, 348, 349, 351, 455/90, 154.1; D14/191; 361/395, 424; 174/66; 341/176

[56] References Cited

U.S. PATENT DOCUMENTS 3,668,528 6/1972 Hutchinson et al. ............... 455/351

Primary Examiner—Reinhard J. Eisenzopf
Assistant Examiner—Timothy H. Keough

[57] ABSTRACT

Pager of a paging system, comprising a housing having therein an electronic part of the pager. A wall of the housing has a recess over substantially the whole surface thereof. In the recess a foil is placed which is chosen out of a number of foils with different design. The heighth of the recess is substantially equal to the thickness of the foil. If the wall has light transparant parts within the circumference of the foil through which components of the electronic part are visible these light transparant parts are aligned with light transparant parts of the foil. The light transparant parts are, in particular, openings.

10 Claims, 1 Drawing Sheet

DESIGN COVERING AND A HOUSING FOR A PAGER

BACKGROUND OF THE INVENTION

The invention relates to a pager of a paging system, comprising a housing having therein an electronic part of the pager.

Pagers of this type are known from practice.

In practice it may happen that a different appearance of a batch of pagers is desired, for instance if of the pagers of said batch only the electronic part is changed with respect to other pagers and/or specific, in particular, large, purchasers of pagers want to have an appearance of the pagers of their own. Until now a different housing needed to be designed or expensive measures had to be made to give the housings a different appearance. With regard to this latter it is noted that usually a housing is closed except for one side and that imprinting thereof is difficult and expensive. Both solutions have the disadvantage that they are only suitable for large batches because otherwise the costs would become too high. In addition in both cases it is not practical if later it is wanted to manufacture a smaller batch. Therefore, in general it is necessary for each housing having its own appearance to manufacture a large number thereof and to keep a number thereof in stock for later use, which in itself is a disadvantage.

SUMMARY OF THE INVENTION

The objective of the invention is to solve the disadvantages of the prior art pager.

This objective is obtained with the pager of the type mentioned in the introductional part by that a wall of the housing has a recess over substantially the whole surface thereof, that a foil is placed in the recess, the foil being chosen out of a number of foils whith different design, and the height of the recess being substantially equal to the thickness of the foil. The foils are relatively cheap to be imprinted, to cut and to keep in stock in large quantities. Therefore one can give a different appearance to a pager practically at any instance in a very simple and cheap manner.

BRIEF DESCRIPTION OF THE DRAWINGS

Other features will appear from the description following hereinafter with reference to the annexed drawing, in which:

FIG. 1 shows a pager of a paging system consisting of a housing 1 having therein an electronic part of the pager. The electronic part usually comprises a display 2 and push button switches 3, which may be visible through light transparent parts of a main wall 4 of the housing 1. In general the light transparent parts of the main wall 4 will be openings in the main wall 4.

Figure 1:
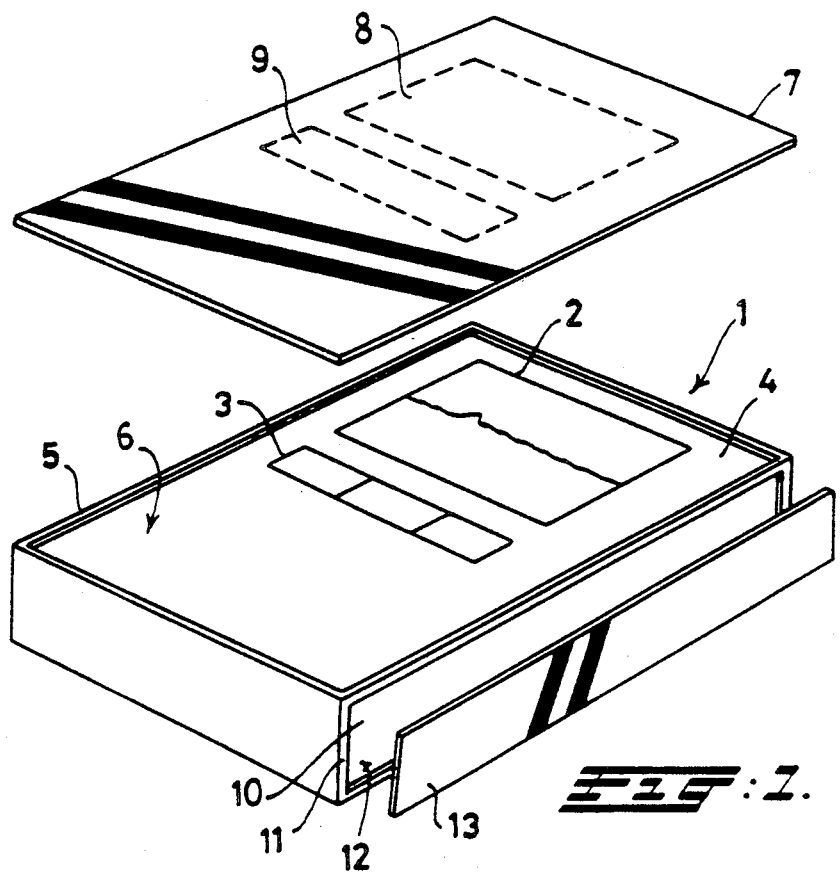
FIG. 1 shows in perspective an exploded view of an embodiment of a pager of a paging system according to the invention.

On the outside and along the circumference of the main wall 4 there is an elevation 5, which therefore forms a recess 6 which extends substantially across the entire surface of the main wall 4.

The pager further comprises a cover foil 7 having a decorative appearance with light transparant parts 8, 9, which, if the foil is placed in the recess 6, are aligned with the display 2 and the buttons 3 respectively.

On other walls of the pager similar foils can be arranged in the same manner. For instance side wall 10 has at its circumference an elevation 11, which forms a recess 12 for arranging therein a foil 13 having a decorative appearance.

The heighth of the elevation 5 and the thickness of the foil 7 are chosen such that after placing the foil 7 in the recess 6 the upper surfaces of the elevation 5 and of the foil 7 are substantially even.

The foil 7 can be arranged easily in the recess 6 by gluing and can therefore have at the bottom side an adhesive layer except for the light transparent part 8 and possibly the light transparent part 9.

Preferably the foil consists of a material which can well be imprinted and which is shrink proof, such as polycarbonate.

With the embodiment shown in FIG. 1 the push button switches 3 are in particular membrane switches.

Figure 2:
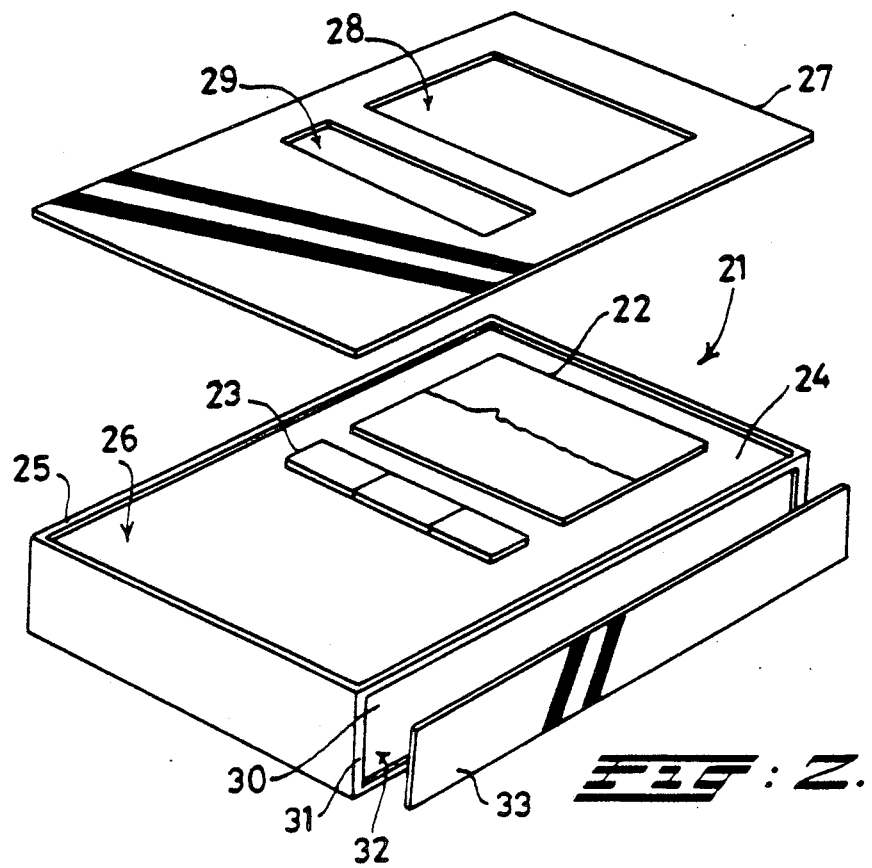
FIG. 2 shows in perspective an exploded view of another embodiment of a pager of a paging system according to the invention.

FIG. 2 shows another embodiment of a pager according to the invention having a housing 21. With this embodiment a display screen 22 and push button switches 23 protrude through openings of a main wall 24 of the housing 21. Along the circumference of the main wall 24 there is an elevation 25 forming a recess 26, which is suitable for containing therein a foil 27 having a decorative appearance and having openings 28 and 29, which are suitable for passing the display screen 22 and the push buttons 23 respectively. Preferably the screen 22, the push buttons 23 and the elevation 25 extend so much above the bottom of the recess 26 that after placing the foil 27 the upper surfaces of the elevation 25 and the foil 27 are substantially even.

Just like with the embodiment of FIG. 1 the embodiment of FIG. 2 has a sidewall 30 with an elevation 31 along the circumference thereof forming a recess 32 for arranging therein a foil 33 having a decorative appearance.

Though not shown, when manufacturing the foil 7, 27, 33, preferably there is departed from a foil of a light transparent material which is imprinted at the side which is placed against the bottom of the recess 6, 26, 32. Therefore mechanical wear has no influence on the imprint, so that a desired appearance of the pager can be maintained longer.

What is claimed is:

1. Pager of a paging system, comprising a housing having therein an electronic part of the pager, wherein a wall of the housing has a recess over substantially the whole surface thereof, that a foil is placed in the recess, the foil being chosen out of a number of foils whith different design, and the height of the recess being substantially equal to the thickness of the foil.

2. Pager according to claim 1, whereby the wall has a number of light transparant parts through which components of the electronic part are visible, wherein the foil has transparent parts above the transparants parts of the wall.

3. Pager according to claim 2, whereby one or more of the light transparent parts of the wall are openings, wherein the light transparent parts of the foil above the openings of the wall are openings.

4. Pager according to claim 3, wherein the recess is bounded by a rib at the outside and along the circumference of the wall.

5. Pager according to claim 3, wherein the foil is in itself a light transparent foil which is imprinted at the side facing to the housing.

6. Pager according to claim 2, wherein the recess is bounded by a rib at the outside and along the circumference of the wall.

7. Pager according to claim 2, wherein the foil is in itself a light transparent foil which is imprinted at the side facing to the housing.

8. Pager according to claim 1, wherein the recess is bounded by a rib at the outside and along the circumference of the wall.

9. Pager according to claim 8, wherein the foil is in itself a light transparent foil which is imprinted at the side facing to the housing.

10. Pager according to claim 1, wherein the foil is in itself a light transparent foil which is imprinted at the side facing to the housing.

* * * * *

UNITED STATES PATENT AND TRADEMARK OFFICE
CERTIFICATE OF CORRECTION

PATENT NO.    :   5,214,794

DATED         :   May 25, 1993

INVENTOR(S)   :   Gert VAN WIJNEN

It is certified that error appears in the above-identified patent and that said Letters Patent is hereby corrected as shown below:

On the title page, item
Please insert the Assignee information as follows:

--[73] Assignee: Ericsson Radio Systems B.V., Va Emmen, The Netherlands--.

Signed and Sealed this

Tenth Day of September, 1996

Attest:

BRUCE LEHMAN

Attesting Officer        Commissioner of Patents and Trademarks